UNITED STATES PATENT OFFICE.

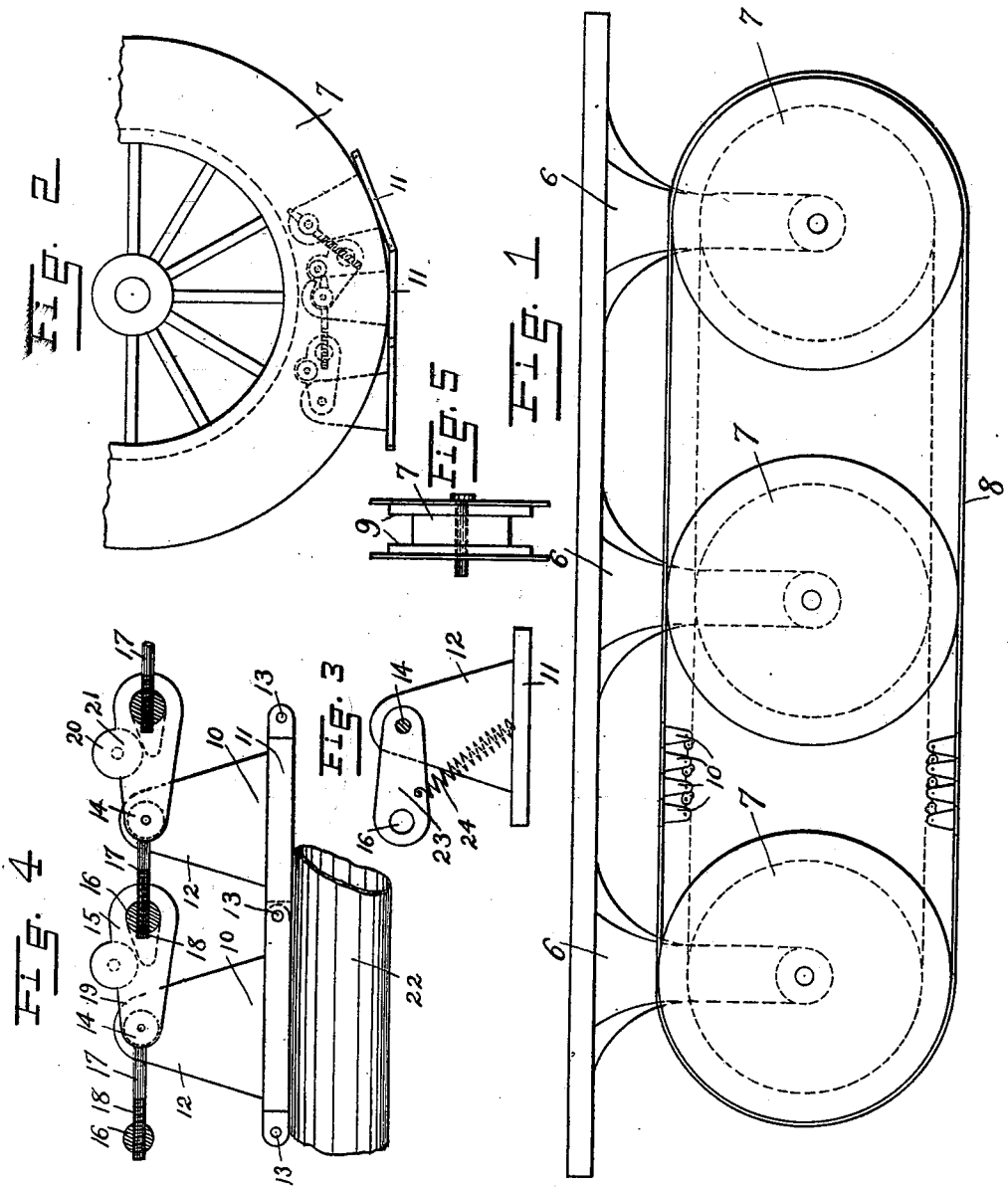

FRANK LOESCHER BEAMOND, OF SUTTON-COLDFIELD, ENGLAND.

VEHICLE.

SPECIFICATION forming part of Letters Patent No. 666,893, dated January 29, 1901.

Application filed June 20, 1900. Serial No. 20,924. (No model.)

*To all whom it may concern:*

Be it known that I, FRANK LOESCHER BEAMOND, a subject of the Queen of Great Britain, residing at Sutton-Coldfield, near Birmingham, in the county of Warwick, England, have invented certain new and useful Improvements in Vehicles, of which the following is a full and complete specification, such as will enable those skilled in the art to which it appertains to make and use the same.

This invention relates to vehicles; and the object thereof is to provide a movable endless tread therefor which is mounted on and moves with relation to the wheels thereof.

The invention consists in the construction and arrangement of parts herein described.

In the accompanying drawings, forming part of this specification, in which like reference characters denote like parts in the several views, Figure 1 is a side elevation of the trucks of a vehicle, showing my improved endless tread applied to the wheels thereof; Fig. 2, a side elevation of a portion of a vehicle-wheel, showing a portion of the movable endless tread applied thereto, the same being upon an enlarged scale. Fig. 3 is a side view of one member of the movable endless tread upon an enlarged scale and showing a modified form of construction; Fig. 4, a side view of several of the members of the movable endless tread shown in Figs. 1 and 2 upon an enlarged scale and partially sectioned and showing a supplemental tubular tread applied thereto; and Fig. 5 is an edge view, upon a diminished scale, of a vehicle-wheel, the same being formed to receive the movable endless tread shown in the other figures.

Referring more particularly to the drawings, I have shown at 6 the trucks of a vehicle and at 7 the wheels of said trucks, upon which is mounted the movable endless tread constructed according to my invention and denoted by the general reference character 8. Each of the wheels 7 is, as shown in Fig. 5, formed with an angularly-grooved periphery 9, and within said grooved peripheries is mounted the movable tread 8, which embodies a plurality of members, each denoted by the general reference character 10 and each consisting of a base-plate 11, provided with a pair of upwardly-directed spaced cheeks 12. The base-plates 11 are pivotally connected at their ends at 13 in a chain or series, and journaled between the upper ends of each pair of cheeks 10 are rollers 14. A pair of links 15 are preferably mounted upon each of the rollers 14 at one end of each and connected at their other ends by a roller 16. Adjustable link-pins 17 are connected with the rollers 16 by threaded end portions 18 and are loosely connected with the rollers 14, being provided with projecting end portions 19, (shown in dotted lines in Fig. 4,) which project beyond the rollers 16. Each of the links 15 is provided with an upwardly-directed cheek 20, and each pair of links 15 is provided with a roller 21 (shown in dotted lines in Fig. 4) and which is journaled between the respective cheeks 20. The projecting ends 19 of the link-pins 17 project beneath the rollers 20 and prevent upward movement of said links 15 as the movable tread 8 passes around the several wheels, causing said links to be pivotally directed toward the base-plates 11.

I preferably secure to the base-plates 11, beneath the same, a tubular supplemental tread 22, which is formed similarly to the ordinary bicycle-tire or in any desired manner. In mounting the movable tread 8 upon the several wheels 7 the cheeks 10 and links 15 and connected parts lie within the grooved peripheries 9, and said wheels, as clearly shown in Figs. 1 and 2, and the base-plates 11 rest upon the extreme peripheries of the said wheels, and as the wheels are turned they successively engage the earth constituting the tread for the wheels.

In Fig. 3 I have shown a modified form of construction comprising the base-plate 11 and cheeks 12, above described, as well as the rollers 14; but the links 23, which are mounted upon the rollers 14, are connected by coiled springs 24 with the base-plate 11. The outer ends of the links 23 are connected by rollers 16 in the same manner as the outer ends of the links 15. The springs 24 tend to cause the links 23 to be depressed toward the base-plates 11 instead of forced outwardly from the same as the movable tread passes about the wheels. The endless movable tread 8 is manifestly passed continuously about the wheels 7 upon the movement of said wheels, successively presenting the base-plates 11 to the earth, and as said base-plates are smooth and plane upon their under surfaces the contact of the wheels with the ground is always even and regular.

I do not limit myself to the specific construction and arrangement of parts herein described, but reserve the right to vary the same within the scope of my invention.

Having fully described my invention, I claim as new and desire to secure by Letters Patent—

1. An endless movable tread for vehicles, which is mounted upon the wheels thereof, comprising a plurality of members which are pivotally connected, each of said members embodying a base-plate, a pair of spaced cheeks connected with said base-plate, a roller journaled between the cheeks of each of said members and a link connected with said roller at one end and adjustably connected with a roller of the next member at the other end, substantially as shown and described.

2. An endless movable tread for vehicles, which is mounted upon the wheels thereof, comprising a plurality of members which are pivotally connected, each of said members embodying a pair of spaced cheeks, rollers mounted in said cheeks, a link connected with said roller at one end and provided at the other end with a roller and also provided with a supplementary roller, an adjusting-pin operatively connected with the roller with which said link is provided at its end and also connected with the roller which is arranged between the cheeks of the next member, said adjusting-pin being provided with a projecting portion which projects beneath the supplemental roller of the said next member, substantially as shown and described.

In testimony that I claim the foregoing as my invention I have signed my name, in presence of the subscribing witnesses, this 8th day of June, 1900.

FRANK LOESCHER BEAMOND.

Witnesses:
JOSEPH COBLEY,
EDWARD STANLEY FRIEND.